April 21, 1959  J. D. ARMSTRONG ET AL  2,883,033
CONVEYOR SYSTEM

Filed May 21, 1953 3 Sheets-Sheet 1

INVENTORS
JOHN D. ARMSTRONG
GEORGE J. FLYNN JR.
WALLACE W. WITTENBERGER
BY Bair Freeman & Molinare
ATTORNEYS

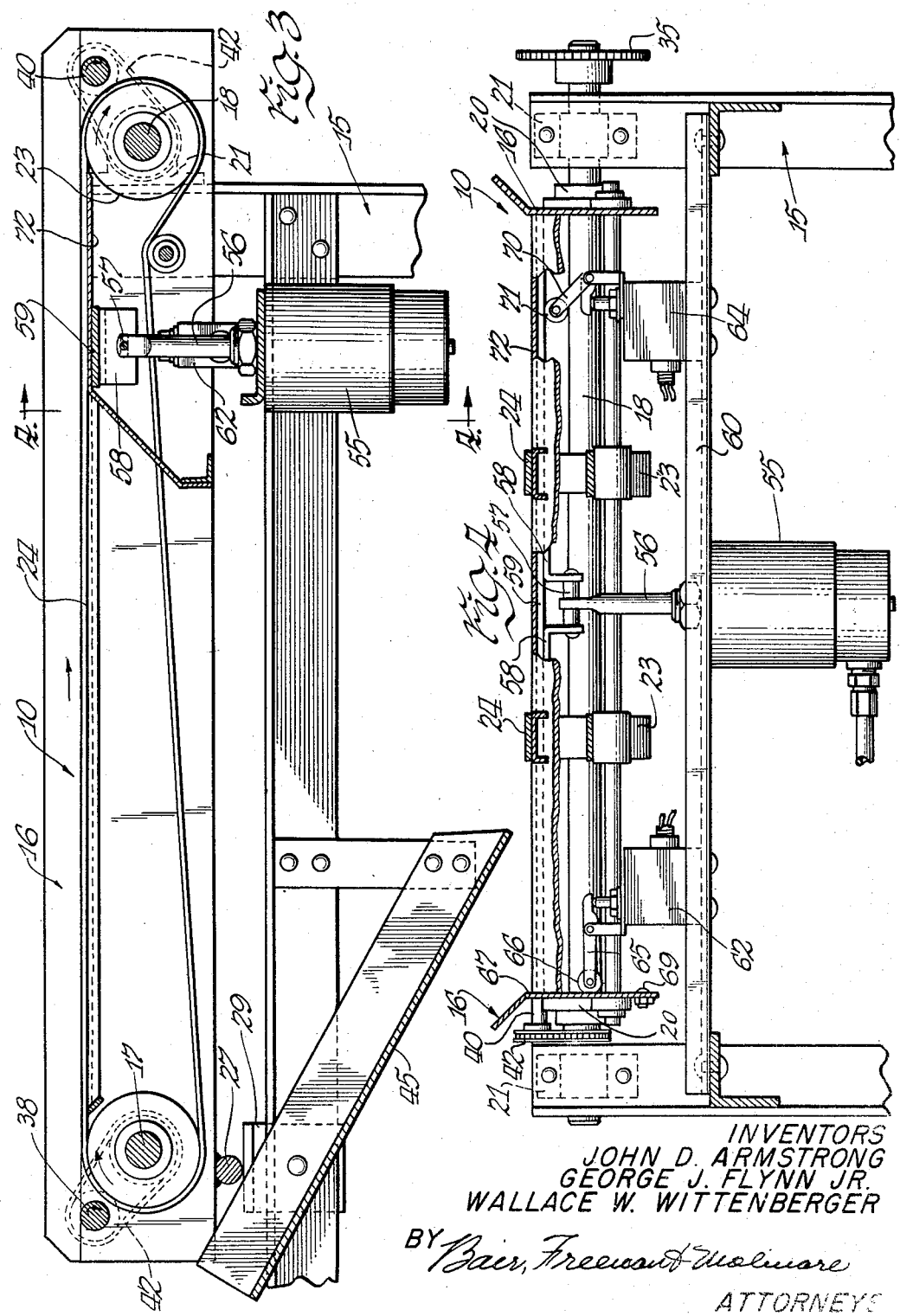

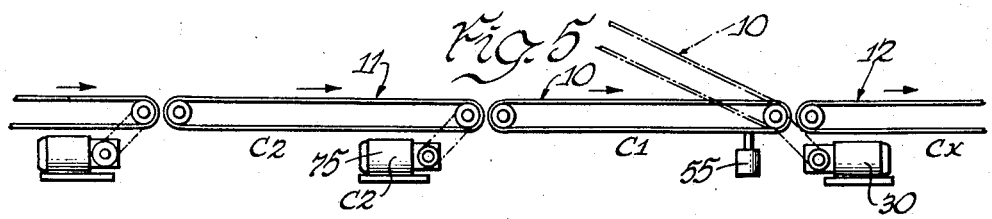
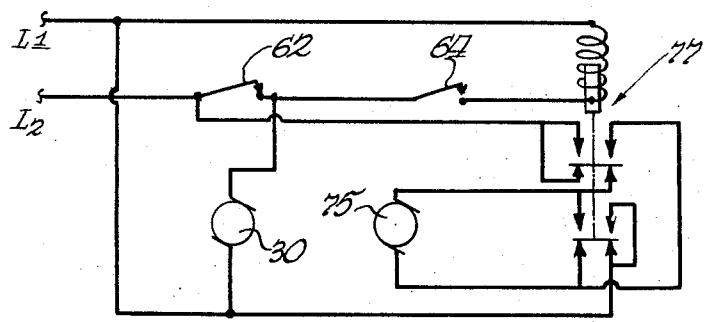
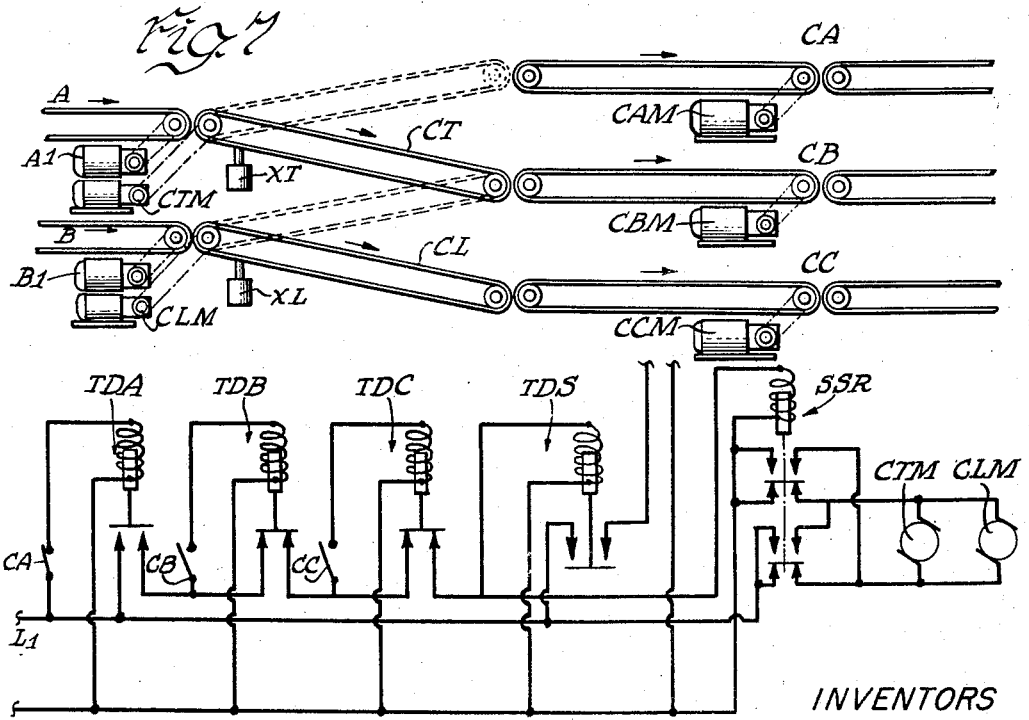
INVENTORS
JOHN D. ARMSTRONG
GEORGE J. FLYNN JR.
WALLACE W. WITTENBERGER
BY Bair, Freemont Molinare
ATTORNEYS United States Patent Office 2,883,033
Patented Apr. 21, 1959

2,883,033
CONVEYOR SYSTEM

John D. Armstrong and George J. Flynn, Jr., Elmhurst, and Wallace W. Wittenberger, Chicago, Ill., assignors, by mesne assignments, to Baker Perkins, Inc., Saginaw, Mich., a corporation of New York Application May 21, 1953, Serial No. 356,358

14 Claims. (Cl. 198—31)

The present invention relates to a conveyor system comprising a plurality of independently driven conveyor units, normally arranged in end to end relation, for continuous feeding of articles from one conveyor unit onto the next adjacent conveyor unit. More particularly, the present invention is directed to a conveyor system employing a movable switch conveyor unit to constitute a bridge between two other linearly spaced apart conveyor units, and wherein the switch conveyor unit is pivotally mounted at one end and the other end being vertically movable out of registration with an adjacent conveyor unit so as to divert the flow of articles into another path of travel.

Such a sysem, by way of example and not limitation, is particularly suitable for use in a complete mechanical bread handling system, such as for commercial bakeries, by virtue of which freshly baked bread is conveyed to and from a cooler and/or to a slicing and wrapping machine. As is well known, there are times in such a system when certain machines or apparatus, forming a part of the system, become inoperative for various reasons, such as due to a jamming condition or where a slicing machine and/or a wrapping machine become inoperative by reason of damage to a slicer blade or exhaustion of wrapping paper. For such purposes, it is highly desirable to provide an arrangement by virtue of which the bread may be temporarily diverted so as to flow into other channels. For example, in such a system if one of the slicing machines becomes inoperative, it is desirable to redirect the flow of bread to another, standby slicing machine, so as to avoid jamming or pile-up of loaves of bread, which may cause damage thereto and which will necessitate manual removal and subsequent replacement of the loaves of bread on the conveyors.

One of the objects of the present invention is to provide a novel conveyor system comprising a movable conveyor unit, interposed between two linearly spaced conveyor units, which is electrically controlled so that in response to the existence of various conditions, said movable conveyor unit is mechanically adjusted so as to divert or redirect the flow of articles from one path of travel to another.

Another object is to provide a novel conveyor arrangement comprising two conveyor units normally arranged in end to end relation and one of the conveyor units constituting a switch or bridge and being mounted so that one end may be moved vertically out of normal registration with the other unit and coincidentally, effecting temporary reversal of the direction of travel of the conveyor unit in the system, preceding the zone of vertical movement of said units, with respect to the normal direction of travel of articles on the conveyor units.

A further object is to provide novel control apparatus for two conveyor units of the character indicated wherein the first of said conveyor units, with respect to normal direction of travel of articles thereon, is temporarily reversed during the time that the movable switch conveyor unit commences movement out of or into registry with the other conveyor unit.

Other objects and advantages of this invention will be apparent from the following description, taken in connection with the accompanying drawings in which:

Figure 3 is an enlarged, longitudinal section of the switch conveyor unit, taken substantially as indicated on line 3—3 on Figure 2.

Figure 4 is an enlarged, transverse sectional view through the conveyor unit, taken substantially as indicated on line 4—4 on Figure 3.

Figure 5 is a diagrammatic representation of a conveyor system embodying our novel switch conveyor unit.

Figure 6 is a wiring diagram of the electrical circuits for controlling the switch conveyor unit and the adjacent next preceding conveyor unit of the system.

Figure 7 is a diagrammatic representation of a modified adaptation of our novel switching arrangement to a multiple conveyor system comprising a plurality of vertically superimposed conveyors.

Figure 8 is a wiring diagram of the electrical circuits for controlling the multiple switch conveyor units of the multiple conveyor system.

Figures 1, 2:
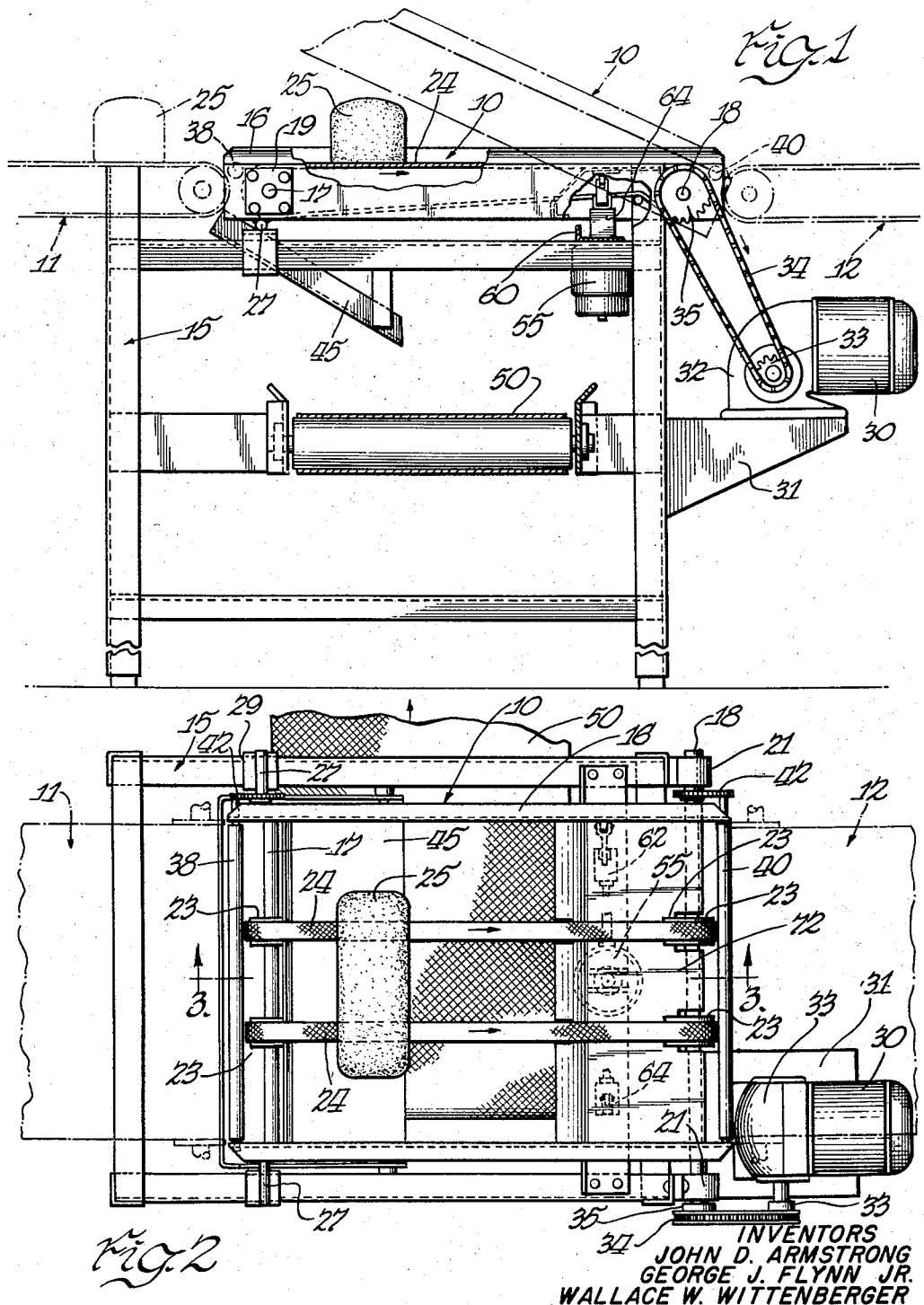
Figure 1 is a side elevational view of the switch conveyor unit embodying the present invention.
Figure 2 is a top plan view of the switch conveyor unit.

Suitable conveyor arrangements and apparatus have heretofore been provided by virtue of which it is possible to mechanically handle and process freshly baked bread as it is removed from the baking oven up to the time that it is sliced and wrapped and ready for delivery. Such mechanized bread handling systems for commercial bakeries effect substantial reduction in personnel normally required in the handling and processing of bread from the time that it is baked until it is ready for delivery. Such mechanized systems also improve the sanitation conditions in handling and processing of bread and further, generally result in substantial saving of space in the bakery.

The conveyor system, including a bridging or switching conveyor unit embodying the present invention, may be employed in various parts of a conveyor system for insuring continuous and efficient operation in the event that certain pieces of apparatus become inoperative or out of adjustment for various reasons. The embodiment of our invention, as represented in Figures 1 to 6 of the drawings, may, for example, be installed in close proximity to a bread slicing machine.

As represented in Figures 1 and 6 of the drawings, there is employed a plurality of separate conveyor units arranged in end to end alignment and interposed in the conveyor system is a switching or bridging conveyor unit, as indicated generally at 10, which is interposed between adjacent conveyor units indicated generally at 11 and 12. In the present embodiment of the invention, as represented in Figures 1 to 6 of the drawings, the switch conveyor unit 10 is electrically interconnected with the preceding conveyor unit 11 of the system.

The switching or bridging conveyor unit 10 is supported on a structural main frame 15, mounted directly on the floor. The conveyor unit 10 comprises a frame 16, in opposite ends of which are journaled head and foot shafts 17 and 18, respectively. The head shaft 17 is journaled at its ends in bearings 19 secured to the sides of the frame 16. End portions of the foot shaft 18 are journaled in bearings 20, secured to the sides of the frame 16, and the outer ends of said foot shaft are journaled in bearings 21 which are secured to uprights of the main frame 15, and constitute a pivotal mounting for the entire movable switch conveyor 10. Mounted on the shafts 17 and 18 are a plurality of sets of aligned, axially spaced-apart, pulleys 23 around which are trained narrow belts 24. The pulleys and belts are spaced apart as seen in Figure 2 of the drawings, a proper distance for supporting opposite end portions of a loaf of bread, indicated generally at 25, as seen in Figure 2 of the drawings. The purpose of such spaced relation of the narrow belts 24 is so that in the event that a loaf of bread 25, as it is received from the next adjacent conveyor 11, is so misaligned as to be incapable of proper support on the spaced belts 24, the loaf of bread will either fall between the spaced belts 24, or fall outside of either of said belts, and be redirected to an auxiliary conveyor system from which such misaligned loaves are manually picked up and replaced on the conveyors. It is of great importance that the loaves of bread as they are being tranported by the conveyor, when they approach the slicing machine, be substantially transversely aligned. While other apparatus is usually provided in the system to assist in aligning the loaves of bread preparatory to passing into the slicing machine, it is desirable to maintain the bread in proper alignment as far as practical to avoid possible jamming on the conveyor system. It must be kept in mind that freshly baked bread cannot stand too severe or rough handling because of the possibility of damaging the crust and which might impair the appearance of the loaf of bread sufficiently as to render it unsalable.

The foot end of the movable conveyor unit 10 is at all times properly supported by the bearings 21. The opposite or head end of the conveyor, when in aligned position with respect to the conveyor 11, is supported on the main frame 15 by means of a rod 27, secured to the underside of the frame 16, as by welding, and the ends of said rod project laterally beyond the conveyor frame 16, as clearly seen in Figure 2 of the drawings, and are seated on pads 29, on the top of the main frame 15.

The movable switch conveyor 10 is driven at its foot end by a motor 30, mounted on a shaft 31 secured to the main frame 15. The motor is directly attached to a speed reducing mechanism 32, having a drive sprocket 33 which, through a chain 34, drives a sprocket wheel 35, mounted on the outer end of the foot shaft 18. Since the foot shaft 18 constitutes the axis about which the entire movable conveyor unit 10 is adapted to swing in an upward direction, as indicated by the dot and dash outline in Figures 1 and 5, the drive to said conveyor is properly maintained at all times. Journaled in opposite ends of the conveyor frame 16 are live rollers 38 and 40, immediately adjacent the periphery of the pulleys 23, which rollers are driven by sprockets and chains 42, from the respective head and foot shafts 17 and 18. These live rollers serve to bridge the gap between the conveyor belts of the switch conveyor unit 10 and the adjacent conveyor units 11 and 12, as seen in Figure 1 of the drawings, so as to insure uniform and continuous feed of the articles from one conveyor unit onto the next conveyor unit.

Mounted immediately below the head or receiving end of the movable conveyor 10, on the main frame 15, is an inclined chute 45, which extends obliquely forward and downward, as seen in Figure 1 of the drawings. When the conveyor 10 is in its raised position, as seen in dot and dash outline in Figure 1, the loaves of bread being delivered by the conveyor 11 discharge directly on to a chute 45 from which they are then discharged onto a transversely extending auxiliary take-away conveyor 50. It is to be understood that the conveyor 50 preferably, but not necessarily, conveys such redirected bread to a temporary collecting station from which it is manually removed, as desired, for replacement on the conveyor system.

The movable conveyor 10 is adapted to be selectively raised to the dot and dash outline position in Figure 1 of the drawings, by an air control unit of a presently available commercial type, as indicated generally at 55, which, it is to be understood, contains an air-operated ram, connected to an externally projecting rod 56, the upper end of which rod is pivotally connected at 57 to a pair of spaced apart lugs 58, extending downwardly from the underside of a mounting member 59, secured at its opposite ends to the sides of the frame 16, between the upper and lower runs of the narrow belts 24. The air control unit 55 is located adjacent the pivot axis 18 of the conveyor unit, and is supported on a transverse structural member 60 of the main frame 15, which is below the movable conveyor frame 10. It is to be understood that the air control unit is operated by an electrical control apparatus (not shown) for controlling the admission of air under pressure for actuating the ram. The air control unit operates under constant pressure and serves to maintain the ram at an extended position and when the ram is vented to atmosphere, the unbalanced weight of the conveyor 10, acting on the ram, causes the conveyor 10 to swing downwardly from its elevated position to its lowermost position, as seen in full lines in Figure 1 of the drawings.

It is to be understood that the air control unit 55 may be manually actuated by closing of an electrical control circuit or the circuit may be part of a circuit including other electrically controlled apparatus, such as for example, a slicing machine which would be correlated to the conveyor system.

Mounted on the frame member 60, as seen in the drawings, are two limit switches 62 and 64 of a well known commercially available type. The switch 62 is normally closed when the movable conveyor 10 is at its lowermost position, in registration of the conveyor 11. Said switch includes a pivotally mounted arm 65, the outer end of which is provided with a roller 66 adapted to ride against the inner face of a side member 67 of the frame 16. The lower portion of the side frame member 67 is provided with a button or cam 69 adapted to engage the roller 66 when the conveyor swings upwardly about its pivot axis, which happens to be the axis of the foot shaft 18, for causing opening of the limit switch 62. Conversely, as the conveyor 10 commences to move from its elevated position, as seen in dot and dash outline in Figure 1, the roller 66 rides off of the cam 69, and the limit switch is again caused to assume a closed position.

The limit switch 64 is normally open when the movable conveyor 10 is at its normal, lowermost operating position. This limit switch includes a pivotally mounted arm 70, the outer end of which is provided with a roller 71 adapted to engage the member 59, secured to the underside of a transverse plate 72. It is to be understood that as soon as the conveyor 10 commences to raise from its lowermost operating position, the limit switch 64 is caused to open and it remains open until the conveyor is again lowered to its normal operating position.

As may be seen in Figure 5 of the drawings, the conveyor 11, which precedes the switching or bridging conveyor 10 in the conveyor system, is provided with an independent motor drive and the motor being indicated generally at 75. The motor 75 of the conveyor 11 is interconnected in an electrical circuit including the limit switches 62 and 64. As seen in the wiring diagram, Figure 6 of the drawings, the motor 30 for the switch conveyor unit 10, and the motor 75 of the conveyor 11 are independently controlled. The two limit switches 62 and 64 are connected in series with the coil of a double-pole, double-throw relay, indicated at 77. As will be noted from the wiring diagram, the motor 30, for the switching conveyor 10, remains energized as long as the limit switch 62 remains closed. In other words, the switching conveyor 10 remains power driven until it approximates the upper limiting position, as indicated in dot and dash outline in Figures 1 and 5, and as soon as the conveyor moves downwardly a short distance, the limit switch 62 again closes so that the drive to the motor 30 is re-established for operating the switching conveyor 10. When the switching conveyor 10 is in its lower normal operating position, the limit switch 64 is open and the motor 75, for driving the preceding conveyor 11 of the system, is energized by the flow of current through the sets of contacts of the relay, as clearly shown in Figure 6 of the drawings. When the switch conveyor 10 commences to raise, the limit switch 62 remains closed (until opened by cam 69 when conveyor approaches upper limit of movement) and limit switch 64 immediately closes, thereby energizing the coil of the relay 77, which breaks the then existing sets of contacts, and establishing the opposite set of contacts so that current flows through the motor 75 in reverse direction and thereby driving the conveyor 11, in reverse direction, during the time that the switch conveyor 10 is being raised. This condition prevails until the limit switch 62 is opened as the conveyor 10 approaches its uppermost limit of movement, and at which time the circuit to the coil of the relay 77, is again broken and by virtue of which the contacts of the relay again assume the position seen in Figure 6 of the drawings for driving the motor 75 and its conveyor 11 in the original direction.

It will now be apparent that when the switching conveyor 10 is being moved, either as a result of manual operation of electrical circuits or incident to automatic control, as above described, the conveyor 11 immediately is reversed in direction of operation so as to temporarily prevent feeding of loaves of bread in the direction of the conveyor 10, and thereby avoiding possible damage and injury to the loaves of bread which would abut against the conveyor 10, in the process of the latter's raising movement. As the conveyor 10 attains its upper limit of movement, the conveyor 11 is again reversed to travel in its initial direction for discharging bread over the foot end thereof onto the chute 45 from which it is discharged onto the take-away conveyor 50. When the conveyor 10 commences to return to its normal or lowermost position, the motor drive for the conveyor 11, is reversed for a short period until the conveyor 10 arrives at its lowermost position of adjustment, in alignment with the conveyor 11, at which time the conveyor 11 is again reversed so that bread may again be continuously fed from the conveyor 11 onto the switching conveyor 10, and in turn, onto the conveyor 12 for further processing. It is to be understood that the switching conveyor 10 is movable under control of the air control unit 55, in a manner so that such movement is relatively slow, in the general range of 3 to 5 seconds for effecting a raising or lowering operation.

In Figures 7 and 8 of the drawings, we have illustrated diagrammatically a modified application of our novel switch conveyor system. The conveyor arrangement as shown for purposes of illustration, may be understood to include two sets of feeding conveyors A and B, arranged in vertically superimposed relation, and which, for example, may be understood to convey bread from two streams that are being fed from a bread cooler. Each of these conveyors preferably are provided with independent motor drives indicated generally at A1 and B1. The bread from the conveyors A and B is adapted to be discharged onto two switching or bridging conveyors designated at CT and CL, for selectively discharging the two streams of bread onto any two of three vertically superimposed sets of conveyors, indicated generally at CA, CB and CC. These latter conveyors are preferably provided with independent motor drives, as indicated generally at CAM, CBM and CCM, and switch conveyors CT and CL are provided with independent motor drives, indicated at CTM and CLM respectively. It may be understood by way of example, that the conveyors CA, CB and CC are connected for feeding bread directly to three different sets of slicing or slicing and/or wrapping machines (not shown).

As above indicated, it is desirable because of various conditions that occur from time to time, to cause a slicing machine to be temporarily shut down, to be able to continuously handle the two streams of bread being mechanically conveyed, by diverting the flow of bread to another conveyor and/or slicing machine, which is usually referred to as a standby machine. In a system which employs two main streams of bread from a cooler for processing through slicing and/or wrapping machines, it is preferred that three slicing machines may be provided, one being a standby machine. Since it is possible that two machines may be simultaneously out of operation, accordingly we provide in the system a switch arrangement as shown in Figures 1 to 6 inclusive, immediately adjacent each slicing machine so that there will not be a pile-up or jamming of bread which would result in damaging of bread, rendering the same unsalable and hence, result in financial loss in operation to the bakery.

In the arrangement shown in Figures 7 and 8, the bridging or switch conveyors CT and CL are pivotally mounted at their forward ends, adjacent the conveyors A and B, and their opposite ends being swingable in a manner so that the free end of the conveyor CT is selectively registrable with the head end of either of the conveyors CA and CB, while the free end of the conveyor CL is selectively registrable with either of the head ends of conveyors CB and CC. It is to be understood that suitable interlocking controls (not shown) are provided in the electrical circuits so that both conveyors CT and CL will not tend to be aligned simultaneously with the head end of the conveyor CB. The bridging conveyors are provided with separate lifting mechanisms of the air control type, as indicated at XT and XL, which are electrically controlled, either manually or automatically, as above described. The two bridging conveyors are provided with and are operated by independent motor drives, including motors indicated at CTM and CLM respectively. While the switching conveyors CT and CL are preferably controlled by the electrical circuits of the slicing machines to which bread is fed by the respective conveyors CA, CB and CC, it may, for convenience, be considered that the respective conveyors CA, CB and CC control the motor drives for the respective switching conveyors CT and CL. Accordingly, the electrical circuits including the motors CTM and CLM for the switching conveyors CT and CL are shown interconnected through a relay SSR, in a series circuit with a time delay relay TDS, which it may be understood is interconnected in an electrical circuit which controls the operation of the air control units XT and XL, which units control the raising and lowering of the switch conveyors CT and CL. Also in series with said relays TDS and SSR are time delay relays TDA, TDB and TDC which include in their circuits respectively, switches CA, CB, CC which may be understood to correspond to the respective conveyors CA, CB, CC for control. In other words, for simplicity of illustration, it may be considered that the operation of the switch conveyors CT and CL will be subject to the condition of operation of conveyors CA, CB and CC in lieu of slicing machines (not shown). Accordingly, for purpose of illustration, it may be assumed that when certain of the conveyors CA, CB and CC are operating their corresponding switches CA, CB and CC are in open position, and when the conveyors, for example, when conveyor CA is not operating, at least not operating for practical purposes in conveying the bread thereon from the feeding conveyor A, then under such conditions its switch CA is in closed position, as seen in the wiring diagram. Now, in the event the external control circuit which operates the air control units XT and XL is operated in a manner so as to cause the switch conveyor CT to be raised from alignment with conveyor CB, which has stopped, so that its discharge end registers with the conveyor system CA, and at which time the conveyor system CA is placed into or is in operation, at that time the switch CA opens and the switch CB closes.

Assuming that the top conveyor CA is not operating and the bottom conveyors CB and CC are running, the switch conveyors CT and CL will be in the position shown in full lines in Figure 7 of the drawings and the switches CB and CC will be open while the switch CA is closed. At this time, the relay TDA is energized through the switch CA to open its relay switch so that the remaining relays are all de-energized.

Assuming now that the conveyor CB should stop, its switch CB will close and assuming that the conveyor CA is started, such condition will effect opening of the switch CA and the relay TDA will be de-energized, and its switch will close to complete circuits to the relays TDS and SSR through the relay contacts TDA, TDB and TDC. At this time switch CB has closed. The relay SSR acts immediately to reverse its double-pole, double-throw switch so that current flows through said motors CTM and CLM in reverse direction and which effects reverse direction of travel of the switching conveyors CT and CL. The relay TDS acts next in sequence to energize the circuit leading to the raising and lowering mechanism controlling the air control units XT and XL so that the upper switch conveyor CT will be raised. The relay TDB is timed to act after the switch conveyor CT has been raised and when its acts, it opens its relay switch to de-energize the relays TDS and SSR to interrupt the lifting mechanism circuit and also reposition the contacts of the relay SSR so that the motors CTM and CLM of the two switching conveyors CT and CL are again driven in their forward direction. The switch CB will remain closed because the conveyor CB is not running and will thereby hold its relay TDB energized with its switch contacts in open position.

It will be apparent that when a changeover takes place involving any other combination of tne conveyors CA, CB and CC corresponding switches and relays will function in a manner, as above described.

It will be noted that by virtue of the control circuit the switch conveyors CT and CL will reverse in direction of travel prior to the movement of the air rams, and it is to be understood that an auxiliary circuit for operating the rams is under the control of the time delay relay TDS. It will also be apparent that each time either or both of the conveyors CT and CL are moved from one position to another, they will temporarily be reversed in their direction of operation, commencing immediately prior to such movement of the conveyors, and as the conveyors assume their new position of registration with the respective conveyors CA, CB and CC, through the control of the relay TDS, the motor drives for the respective switching conveyors CT and CL are again re-established in forward direction.

Although we have herein shown and described certain preferred embodiments of our invention, manifestly it is capable of further modification and rearrangement of parts without departing from the spirit and scope thereof. We do not, therefore, wish to be understood as limiting this invention to the precise embodiments herein disclosed, except as we may be so limited by the appended claims.

We claim:

1. In a conveyor system comprising two separate conveyor units arranged normally in end to end relation for continuous feeding of articles from one onto the other, independent motor drives for each conveyor unit, one of said conveyor units being pivotally mounted at one end, means for raising and lowering the opposite end of said conveyor unit out of and into registering relation with the adjacent end of the other conveyor unit, and electrical control means for temporarily reversing the motor drive for the first conveyor unit of the system, with respect to the normal direction of travel of articles on said units, during the initial portion of raising movement of said one conveyor unit.

2. In a conveyor system comprising two separate conveyor units arranged normally in end to end relation for continuous feeding of articles from one onto the other, independent motor drives for each conveyor unit, one of said conveyor units being pivotally mounted at one end, means for raising and lowering the opposite end of said conveyor unit out of and into registering relation with the adjacent end of the other conveyor unit, and electrical control means for temporarily reversing the motor drive for the first conveyor unit of the system, with respect to the normal direction of travel of articles on said units, during the lowering movement of said one conveyor unit.

3. In a conveyor system comprising two separate conveyor units arranged normally in end to end relation for continuous feeding of articles from one onto the other, independent motor drives for each conveyor unit, one of said conveyor units being pivotally mounted at one end, means for raising and lowering the opposite end of said conveyor unit out of and into registering relation with the adjacent end of the other conveyor unit, and electrical control means for temporarily reversing the motor drive for the first conveyor unit of the system, with respect to the normal direction of travel of articles on said units, during the initial portion of raising movement and during the lowering movement of said one conveyor unit.

4. In a conveyor system comprising two separate conveyor units arranged normally in end to end relation for continuous feeding of articles from one onto the other, independent motor drives for each conveyor unit, one of said conveyor units being pivotally mounted at one end, means for raising and lowering the opposite end of said conveyor unit out of and into registering relation with the adjacent end of the other conveyor unit, and electrical control means operable coincident with said raising and lowering means for temporarily reversing the motor drive for the first conveyor unit of the system, with respect to the normal direction of travel of articles on said units, during the initial portion of raising movement of said one conveyor unit.

5. In a conveyor system comprising two separate conveyor units arranged normally in end to end relation for continuous feeding of articles from one onto the other, independent motor drives for each conveyor unit, one of said conveyor units being pivotally mounted at one end, means for raising and lowering the opposite end of said conveyor unit out of and into registering relation with the adjacent end of the other conveyor unit, and electrical control means operable coincident with said raising and lowering means for temporarily reversing the motor drive for the first conveyor unit of the system, with respect to the normal direction of travel of articles on said units, during the lowering movement of said one conveyor unit.

6. In a conveyor system comprising two separate conveyor units arranged normally in end to end relation for continuous feeding of articles from one onto the other, independent motor drives for each conveyor unit, one of said conveyor units being pivotally mounted at one end, means for raising and lowering the opposite end of said conveyor unit out of and into registering relation with the adjacent end of the other conveyor unit, and electrical control means operable coincident with said raising and lowering means for temporarily reversing the motor drive for the first conveyor unit of the system, with respect to the normal direction of travel of articles on said units, during the initial portion of raising movement and during the lowering movement of said one conveyor unit.

7. In a conveyor system comprising two separate conveyor units arranged normally in end to end relation for continuous feeding of articles from one onto the other, independent motor drives for each conveyor unit, one of said conveyor units being mounted for pivotal movement at one end, about a horizontal axis, located remote from the other conveyor unit, means for raising and lowering the opposite end of said conveyor unit out of and into registering relation with the adjacent end of the other conveyor unit, and electrical control means for temporarily reversing the motor drive for the first conveyor unit of the system, with respect to the normal direction of travel of articles on said units, during the initial portion of raising movement of said one conveyor unit.

8. In a conveyor system comprising two separate conveyor units arranged normally in end to end relation for continuous feeding of articles from one onto the other, independent motor drives for each conveyor unit, one of said conveyor units being pivotally mounted at one end, means for raising and lowering the opposite end of said conveyor unit out of and into registering relation with the adjacent end of the other conveyor unit, a discharge chute mounted below the movable end of said one conveyor unit for receiving articles from the other conveyor unit when said movable end of said one conveyor unit is in a raised position, and electrical control means for temporarily reversing the motor drive for the first conveyor unit of the system, with respect to the normal direction of travel of articles on said units, during the initial portion of raising movement of said one conveyor unit.

9. In a conveyor system comprising two separate conveyor units arranged normally in end to end relation for continuous feeding of articles from one onto the other, independent motor drives for each conveyor unit, one of said conveyor units being pivotally mounted at one end, means for raising and lowering the opposite end of said conveyor unit out of and into registering relation with the adjacent end of the other conveyor unit, and electrical control means for temporarily reversing the motor drive for the first conveyor unit of the system, with respect to the normal direction of travel of articles on said units, during the initial portion of raising movement and during the lowering movement of said one conveyor unit, said control means comprising a first normally closed limit switch adapted to be opened when the movable end of said one conveyor approaches its upper limit of movement, a second normally open limit switch adapted to be closed during the initial portion of raising movement of said one conveyor, said switches also operating in opposite manner as said one conveyor is lowered, and a reversing relay connected in circuit with said limit switches and the motor of the drive mechanism for said one conveyor.

10. In a conveyor system comprising a feeding conveyor and two vertically spaced apart take-away conveyors, a switch conveyor unit interposed between the feed conveyor and the take-away conveyors, said switch conveyor being pivotally mounted on a horizontal axis adjacent the discharge end of the feed conveyor and the opposite end being movable to register with the adjacent end of either of the take-away conveyors, an independent motor drive for said switching conveyor, means for moving said switch conveyor to position its discharge end in registration with either of said take-away conveyors, and electrical control means operable coincident with such movement of said switching conveyor for temporarily reversing the motor drive of the said switching conveyor during at least a portion of the time while it moves from registration with one takeaway conveyor into registration with the other.

11. In a conveyor system comprising two separate conveyor units arranged normally in end to end relation for continuous feeding of articles from one onto the other, independent motor drives for each conveyor unit, one of said conveyor units being pivotally mounted at one end, means for raising and lowering the opposite end of said conveyor unit out of and into registering relation with the adjacent end of the other conveyor unit, and electrical control means for temporarily reversing the motor drive for the first conveyor unit of the system, with respect to the normal direction of travel of articles on said units, during the initial portion of raising movement of said one conveyor unit, and for re-reversing the motor drive for the first conveyor unit of the system, with respect to the normal direction of travel of articles on said units, when said one conveyor is at its raised position.

12. In a conveyor system comprising two separate conveyor units arranged normally in end to end relation for continuous feeding of articles from one onto the other, independent motor drives for each conveyor unit, one of said conveyor units being pivotally mounted at one end, means for raising and lowering the opposite end of said conveyor unit out of and into registering relation with the adjacent end of the other conveyor unit, and electrical control means for temporarily reversing the motor drive for the first conveyor unit of the system, with respect to the normal direction of travel of articles on said units, during the lowering movement of said one conveyor unit, and for re-reversing the motor drive for the first conveyor unit of the system, with respect to the normal direction of travel of articles on said units, when said one conveyor is at its lowered position.

13. In a conveyor system comprising two separate conveyor units arranged normally in end to end relation for continuous feeding of articles from one onto the other, independent motor drives for each conveyor unit, one of said conveyor units being pivotally mounted at one end, means for raising and lowering the opposite end of said conveyor unit out of and into registering relation with the adjacent end of the other conveyor unit, and electrical control means for temporarily reversing the motor drive for the first conveyor unit of the system, with respect to the normal direction of travel of articles on said units, during the initial portion of raising movement and during the lowering movement of said one conveyor unit, and for re-reversing the motor drive for the first conveyor unit of the system, with respect to the normal direction of travel of articles on said units, when said one conveyor unit is at either its raised or lowered position.

14. In a conveyor system comprising two separate conveyor units arranged normally in end to end relation for continuous feeding of articles from one onto the other, independent motor drives for each conveyor unit, one of said conveyor units being pivotally mounted at one end, means for shifting the opposite end of said conveyor unit out of and into registering relation with the adjacent end of the other conveyor unit, and electrical control means for temporarily reversing the motor drive for the first conveyor unit of the system, with respect to the normal direction of travel of articles on said units, during the shifting movement of said one conveyor unit.

References Cited in the file of this patent

UNITED STATES PATENTS

| 2,476,371 | Haumann | July 19, 1949 |
| 2,566,210 | Kendall | Aug. 28, 1951 |
| 2,587,959 | Biner | Mar. 4, 1952 |
| 2,660,432 | Wilske | Nov. 24, 1953 |